（12） United States Patent
Bellippady (10) Patent No.: US 11,752,423 B2
(45) Date of Patent: Sep. 12, 2023

(54) SYSTEM AND METHOD FOR COUNTERACTING FOOT MOTION RELATIVE TO A SURFACE

(71) Applicant: Akash Bellippady, Shrewsbury, MA (US)

(72) Inventor: Akash Bellippady, Shrewsbury, MA (US)

(\*) Notice: Subject to any disclaimer, the term of this patent is extended or adjusted under 35 U.S.C. 154(b) by 301 days.

(21) Appl. No.: 17/307,587

(22) Filed: May 4, 2021

(65) Prior Publication Data

US 2021/0362040 A1 Nov. 25, 2021

Related U.S. Application Data

(60) Provisional application No. 63/029,665, filed on May 25, 2020.

(51) Int. Cl.

| | |
|---|---|
| *A63F 13/214* | (2014.01) |
| *A63F 13/211* | (2014.01) |
| *A63F 13/212* | (2014.01) |
| *A63F 13/218* | (2014.01) |
| *A43B 3/34* | (2022.01) |

(52) U.S. Cl.
CPC ............ *A63F 13/214* (2014.09); *A43B 3/34* (2022.01); *A63F 13/211* (2014.09); *A63F 13/212* (2014.09); *A63F 13/218* (2014.09); *A63F 2300/105* (2013.01); *A63F 2300/1012* (2013.01); *A63F 2300/1056* (2013.01); *A63F 2300/1068* (2013.01); *A63F 2300/8082* (2013.01)

(58) Field of Classification Search
CPC .... A63F 13/214; A63F 13/211; A63F 13/212; A63F 13/218; A63F 2300/1012; A63F 2300/105; A63F 2300/1056; A63F 2300/1068; A63F 2300/8082; A43B 3/34; A43B 3/44
See application file for complete search history.

(56) References Cited

U.S. PATENT DOCUMENTS

| | | | | |
|---|---|---|---|---|
| 6,050,822 A | * | 4/2000 | Faughn | G06F 3/011 |
| | | | | 482/902 |
| 6,106,397 A | * | 8/2000 | Phillips | G09B 9/00 |
| | | | | 463/36 |

(Continued)

FOREIGN PATENT DOCUMENTS

| | | | | |
|---|---|---|---|---|
| CN | 105876996 A | * | 8/2016 | ............ A43B 13/14 |

*Primary Examiner* — Dmitry Suhol
*Assistant Examiner* — Carl V Larsen
(74) *Attorney, Agent, or Firm* — Prince Lobel Tye LLP (57) ABSTRACT

A system and method that counteracts foot motion relative to a surface, wherein the foot carries footwear. There are a plurality of magnetic units, each unit comprising a magnet located proximate an underside of the surface. There are sensors for determining one or more of the position, orientation, acceleration, and force of the foot on the surface. A controller is in communication with the sensors and the magnetic units. The controller is configured to control the magnets to develop a time-varying magnetic field that induces currents in a conductor of the footwear such that a magnetic field created by the induced currents opposes the time-varying magnetic field, creating a repulsive force that reduces frictional forces between the footwear and the surface.

20 Claims, 4 Drawing Sheets

(56) References Cited

U.S. PATENT DOCUMENTS

| | | | | |
|---|---|---|---|---|
| 6,270,414 | B2* | 8/2001 | Roelofs | G06F 3/011 |
| | | | | 345/157 |
| 7,470,218 | B2* | 12/2008 | Williams | G06F 3/011 |
| | | | | 482/148 |
| 9,329,681 | B2* | 5/2016 | Goetgeluk | A63B 69/0064 |
| 10,101,805 | B2* | 10/2018 | Choi | A63B 69/0035 |
| 10,259,653 | B2* | 4/2019 | Leong | B65G 39/02 |
| 10,732,197 | B2* | 8/2020 | Smoot | H04W 4/00 |
| 10,933,320 | B2* | 3/2021 | Goetgeluk | A61B 5/1038 |
| 11,123,601 | B2* | 9/2021 | Olsson | G06F 3/011 |
| 2007/0109259 | A1* | 5/2007 | Liu | G06F 3/011 |
| | | | | 345/156 |
| 2009/0058855 | A1* | 3/2009 | Mishra | G06F 3/011 |
| | | | | 345/427 |
| 2017/0336860 | A1* | 11/2017 | Smoot | G06F 3/016 |
| 2018/0217662 | A1* | 8/2018 | Smoot | A63B 24/0021 |
| 2018/0264321 | A1* | 9/2018 | Nir | A63F 13/235 |
| 2019/0046871 | A1* | 2/2019 | Froy | G07F 17/32 |
| 2020/0088758 | A1* | 3/2020 | Smoot | H04W 4/027 |
| 2023/0031046 | A1* | 2/2023 | Liu | A63B 71/0622 |

* cited by examiner

SYSTEM AND METHOD FOR COUNTERACTING FOOT MOTION RELATIVE TO A SURFACE

CROSS-REFERENCE TO RELATED APPLICATION

This application claims priority of Provisional Patent Application 63/029,665 filed on May 25, 2020, the disclosure of which is incorporated by reference in its entirety, for all purposes.

BACKGROUND

This disclosure relates to a system and method for counteracting foot motion relative to a surface.

Some virtual reality (VR) video games include a platform on which the user stands and moves during the game. Since normal movements may convey the user off of the platform, the user must modify normal movements. This can make the game more unnatural than may be desirable.

SUMMARY

The system and method of this disclosure involves determining information regarding a user's foot relative to an active surface. The information can include some or all of the position, orientation, acceleration and force of the foot on the active surface. The active surface includes a number of separately-controlled movable magnetic sources that are configured to develop a changing magnetic field. The foot carries a conductor. When the magnetic sources are moved and the conductor carried by the foot is close enough to be acted on by the resulting changing magnetic field, a current is induced in the conductor. The magnetic field created by the induced current opposes the changing magnetic field, creating a repulsive force that reduces frictional forces between the foot and the active surface. By properly controlling or manipulating the magnetic sources to create a changing magnetic field, friction of the foot on the active surface can be opposed such that the person can walk or otherwise move on the active surface without changing their relative position (or, at a minimum, with less of a change to their position). The person is thus able to move normally while remaining in place or close to in place on the active surface.

In an example the active surface is part of a small platform on which a person can stand and move. Motions of the user's body can be sensed and fed to a virtual reality scene. The invention thus allows a player of a virtual reality (VR) video game to move normally in the person's interactions with the game. The invention can be used in other manners such as for exercise or athletic purposes, or other uses as desired.

All examples and features mentioned below can be combined in any technically possible way.

In one aspect, a system for counteracting foot motion relative to a surface, wherein the foot carries footwear, includes a plurality of magnetic units, each unit comprising a magnet located proximate an underside of the surface, sensors for determining one or more of the position, orientation, acceleration, and force of the foot on the surface, and a controller that is in communication with the sensors and the magnetic units, wherein the controller is configured to control the magnets to develop a time-varying magnetic field that induces currents in a conductor of the footwear such that a magnetic field created by the induced currents opposes the time-varying magnetic field, creating a repulsive force that reduces frictional forces between the footwear and the surface.

Some examples include one of the above and/or below features, or any combination thereof. In an example the controller is configured to control the magnets so as to oppose friction of the footwear on the surface such that the person can walk on the surface without substantially changing their relative position, so that the person is able to move normally while remaining on the surface. In an example the surface is part of a platform on which a person can stand and move. In an example the sensors are configured to sense motions of at least parts of a user's body. In an example the system further includes a controller that is configured to feed the sensed motions to a virtual reality scene such that a player of a virtual reality video game is able to move normally on the platform in the person's interactions with the game.

Some examples include one of the above and/or below features, or any combination thereof. In an example the footwear comprises a non-magnetic metal, wherein a magnetic field can be induced in the non-magnetic metal by the magnetic field from the magnetic units. In an example the footwear further comprises at least one of material to cool the non-magnetic metal and insulation between the non-magnetic metal and the user's foot in the footwear. In an example the footwear further comprises at least one of elements of a non-contact position-determining system, an inertial measurement unit that is configured to sense acceleration and orientation, and a force sensor.

Some examples include one of the above and/or below features, or any combination thereof. In an example the magnetic units each comprise a motor that is configured to spin the magnet of the magnetic unit. In an example the magnet of the magnetic unit comprises a Halbach magnetic array. In an example the controller is configured to control when the magnets are spun. In an example the controller is further configured to control a spin speed of the magnets. In an example the magnetic units each comprise an electromagnet. In an example the controller is further configured to control whether the electromagnet is on or off. In an example the controller is further configured to control a strength of a magnetic field from the electromagnet.

Some examples include one of the above and/or below features, or any combination thereof. In an example the controller is further configured to use sensor data to make predictions of foot movement that are used to determine control of the magnetic units. In an example the controller is further configured to compare predictions of foot movement to sensed foot movements, and adjust future foot movement predictions based on the comparison.

In another aspect, a system for counteracting foot motion of a user relative to a surface includes a plurality of magnetic units, each unit comprising a magnet located proximate an underside of the surface, footwear configured to be worn by the user and comprising a non-magnetic conductor, sensors for determining at least the position, orientation, acceleration, and force of the foot on the surface, and a controller that is in communication with the sensors and the magnetic units, wherein the controller is configured to control the magnets to develop a time-varying magnetic field that induces currents in the conductor of the footwear such that a magnetic field created by the induced currents opposes the time-varying magnetic field, creating a repulsive force that reduces frictional forces between the footwear and the surface.

Some examples include one of the above and/or below features, or any combination thereof. In an example the footwear further comprises a material to cool the non-magnetic metal, and insulation between the non-magnetic metal and an expected location of the user's foot in the footwear. In an example the footwear further comprises: elements of a non-contact position-determining system; an inertial measurement unit that is configured to sense acceleration and orientation; and a plurality of force sensors.

BRIEF DESCRIPTION OF THE DRAWINGS

Various aspects of at least one example are discussed below with reference to the accompanying figures, which are not intended to be drawn to scale. The figures are included to provide illustration and a further understanding of the various aspects and examples, and are incorporated in and constitute a part of this specification, but are not intended as a definition of the limits of the inventions. In the figures, identical or nearly identical components illustrated in various figures may be represented by a like reference character or numeral. For purposes of clarity, not every component may be labeled in every figure. In the figures.

DETAILED DESCRIPTION

The system and method involves determining information regarding a user's foot relative to an active surface. The information includes one or more of the position, orientation, acceleration and force of the foot on the active surface. The active surface includes a number of separately-controlled magnetic sources that are each configured to develop a changing magnetic field in a part of the active surface. In some examples the magnetic sources each include a permanent magnet or an array of permanent magnets. In other examples the magnetic sources include electromagnets. The magnets or arrays can each be controlled, to develop the changing magnetic field. For example, permanent magnets can be spun and their spin speed can be controlled, while electromagnets can be turned on and off and varied from low to high strength. In some examples the angle of the magnetic source relative to the surface can also be controlled. The angle changes the direction of the repulsion interaction between the magnetic force and the reflected magnetic force. It may be best to maintain a 90 degree angle (forces should be parallel to each other) between the forces for best controlled repulsion. However, mechanisms such as supporting rods and couplers can be used to vary the angle of the magnetic source.

The footwear carries a non-magnetic conductor. When the magnetic sources are controlled so as to create a time-varying magnetic field at the location of the footwear, and the conductor carried by the foot is close enough to be acted on by the resulting changing magnetic field, a current is induced in the conductor. The magnetic field created by the induced current opposes the changing magnetic field from the magnetic sources, creating a repulsive force that reduces frictional forces between the footwear and the active surface. By properly controlling the magnetic sources, friction of the footwear on the active surface can be opposed such that the person can walk or otherwise move on the active surface, without changing their relative position (or, at a minimum, with less of a change to their position). The person is thus able to move normally while remaining in place or close to in place on the active surface.

Examples of the systems, methods and apparatuses discussed herein are not limited in application to the details of construction and the arrangement of components set forth in the following description or illustrated in the accompanying drawings. The systems, methods and apparatuses are capable of implementation in other examples and of being practiced or of being carried out in various ways. Examples of specific implementations are provided herein for illustrative purposes only and are not intended to be limiting. In particular, functions, components, elements, and features discussed in connection with any one or more examples are not intended to be excluded from a similar role in any other examples.

Examples disclosed herein may be combined with other examples in any manner consistent with at least one of the principles disclosed herein, and references to "an example," "some examples," "an alternate example," "various examples," "one example" or the like are not necessarily mutually exclusive and are intended to indicate that a particular feature, structure, or characteristic described may be included in at least one example. The appearances of such terms herein are not necessarily all referring to the same example.

Also, the phraseology and terminology used herein is for the purpose of description and should not be regarded as limiting. Any references to examples, components, elements, acts, or functions of the computer program products, systems and methods herein referred to in the singular may also embrace embodiments including a plurality, and any references in plural to any example, component, element, act, or function herein may also embrace examples including only a singularity. Accordingly, references in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

Following includes a more detailed description of the system and how it is operated, and the apparatuses, with reference to the drawings/figures. The following also describes the methods contemplated herein.

In some examples the devices involved in the system and method include a platform and the footwear. The platform works by levitating a person's foot very slightly off the platform during points in their gait cycle in which they are trying to utilize friction to displace themselves. To do this the platform (system) should learn, understand, and know everything about how a person moves, predict where every footstep of the user is going to land, and know how much force the footstep is expected to land with. Once it has the information the system will create a changing magnetic field in the path that the person's foot would normally travel in a gait cycle (i.e., where the person is expected to place the foot). This creates a repulsion in the non-magnetic conductive metal in the footwear the user is wearing when the footwear is over those sections of the platform.

In some examples the system uses a series of separately controlled spinning magnets (permanent or electromagnets) located in or just below an active surface of a first portion of the system, which in an example is a small platform on which the user can stand, walk, run, and otherwise move. The magnetic sources can alternatively be electromagnets wherein the on/off state and magnetic field strength is controllable, to create the time-varying magnetic field. The system also includes a non-magnetic metal located in the user's footwear. The changing magnetic field caused by the spinning magnets or the electromagnets induces a reflected magnetic field in the footwear's metal. The reflected magnetic field causes a repulsion between the two objects, and thus pushes the foot away from the active surface, thereby reducing friction between the footwear and the surface. The spin speed of the magnets can help dictate the amount of magnetic repulsion. Spin speed is relational to the variation of the magnetic field that a portion of the non-magnetic conductive metal is experiencing. The faster the magnets are spun the greater the frequency of the change to the magnetic field and thus the more current is induced, leading to a stronger induced magnetic field. For electromagnets, their on/off frequency and time, and the strength of the field can be varied, The result is a friction reduction system that is configured to reduce or cancel frictional forces related to the motion of "stepping" in human activities (walking, running, etc.).

In an example the permanent magnets are arranged in a Halbach array formation, to increase the magnetic force on the side facing up, toward the metal in the footwear. System sensors are used to inform about the user's foot position, orientation, and acceleration, as well as the weight (force) on the surface via the foot. In an example some or all of the sensors are located in the footwear and wirelessly communicate with a system controller. In an example some of the sensors are located in the platform or elsewhere in a manner in which they can be effective to sense the desired parameter. Using the sensor data, the system calculates the probable path of the foot, and how to spin or otherwise control one or more of the magnetic sources to counteract foot motion. The system thus counteracts the friction involved in moving a person forward, backward, or sideways. This allows the user to move the legs and feet in a normal manner, while maintain the user in place on the platform. In an example the footwear includes a non-magnetic metal base, insulator, means for cooling the footwear, and the sensors.

As background to friction and force and the roles they play in walking, a person moves forward by putting a force down and back into the surface they are walking on. The downward force is largely dependent on the person's weight and how much "power" they put into a step. The backward force is also dependent on the same factors as the downward force, but for a person to effectively put that force into the ground and displace themselves, it is largely dependent on the person's friction with the ground. The reason a person can move forward is because of the friction they have with the surface they walk on. This is the same reason that when that friction is low (like walking on ice or other slippery surfaces) they slip or are unable to move forward efficiently. Friction and force are the two main components in how a person is able to move, walk, or run in a direction. A gait cycle is the pattern in which a person moves their leg in such a way to move forward. The duration, in a gait cycle, in which a person utilizes friction to displace themselves is from when their foot initially makes contact with the ground to when their foot leaves the ground, during the "stance" phase of the gait.

The system functions to keep a person in one place while also allowing them to move their legs and feet normally to walk or run freely in any direction. This is done by temporarily replacing the surface they are on with a "pseudo-surface" (with less friction) that prevents or inhibits a person from utilizing friction (of the original surface), while still being able to support a downward force. This pseudo-surface is in some examples only active during the durations in a person's gait-cycle (walking-cycle) when they attempt to utilize friction to displace themselves. Accordingly, the user can move freely on a small surface without moving off of the surface. The pseudo-surface follows the bottom of the footwear and provides stability equal to the surface that the person was on; its only purpose is to not allow the person to utilize the friction of the surface they were on so they do not walk off the surface. The pseudo-surface will turn off during radical movement or when stopping motion mid-step, and the foot will return to the ground to prevent the user from slipping. The pseudo-surface will restart when utilization of friction begins again. This is all in support of normal motion when using the system. More specifically, at the point or right before the point where a person has finished "loading" their weight on to one foot would be where the friction reduction caused by the subject system begins. At that point is where transition from loading weight to leveraging friction to moving forward occurs, or transition from putting a force down into the walking surface to putting a force down and back into the surface. During this time, the amount of friction reduction that occurs due to the subject system may roughly represent a bell curve, or more generally high to low, because in order for a person to keep a sense of stability with the surface they are on they need to experience some friction at the beginning and end of a step.

The temporary pseudo-surface is created by the repulsion between two magnetic forces, found in the footwear worn by the person and the surface they are walking on. These forces are created through an application of Lenz's law. By spinning magnets (which can be but need not be in a Halbach array (or alternating pole configuration)) or controlling the power applied to electromagnets, where the magnets are located under a nonmagnetic metal surface, a reflected magnet field will be induced in the non-magnetic metal of the footwear, creating a repulsion. In this case, the sole of the footwear contains the non-magnetic metal and the platform or other structure that forms the active surface the user moves on contains the controlled magnets.

In an example the footwear has, in addition to a non-magnetic metal, one or more of an insulator, a cooler, and sensors. The insulator's role is preventing heat from the non-magnetic metal affecting the rest of the footwear, since the magnetic field that is induced within the metal will heat up the non-magnetic metal. The cooler's role is to keep the non-magnetic metal relatively cool, to prevent temperature-based changes in properties that may affect its ability to form the necessary magnetic field.

The sensors in the footwear communicate to the system the position, orientation, acceleration, and weight (force) of each foot. The sensors are involved in the system's determination of how and when the magnets in the device will be controlled in order to generate the effect of controlled friction reduction while the user is moving. Based on the information collected by the sensors in the footwear, the system will control how the magnets are spun or energized: for example, the speed at which to spin, the position of the magnets, and the orientation of the magnets in 3D space. This is so the generation of reflected magnetic fields that produce repulsion can be controlled and created effectively, and so the maintenance of allowing a person to walk in one place as normally they would without any obstruction can be done seamlessly.

In sum, the system is effective to make a person who is walking normally on the device, in any direction, not go actually move across the surface of the device/platform.

In the system magnetic repulsion between a magnetic field and an induced, mirrored magnetic field in a non-magnetic metal is used to reduce friction in footwear, worn by a user, in order to keep the person in a confined area while imitating regular unrestricted motion. If someone were to be watching a person use the system, it would seem like the system was not doing anything other than allowing a person to be able to walk in one place as they would normally walk around. At a high level the system is a way to control when and how someone utilizes friction to move. The sensors are used to collect information, the system then predicts the location and parameters of the time-varying magnetic fields to be created, and it then controls the necessary magnetic units for the necessary amount of time. This is repeated as needed.

In some examples the system improves performance such as by the use of machine learning. As is known, machine learning is a methodology in which the system can automatically learn and improve from experience without being explicitly programmed. The idea is to have the sensors' data (from the user's movements) feed into an algorithm that will try to create patterns and relationships from it. Then it will be able to make predictions based on those relationships and relate that to the system in order to help instruct what magnetic units to activate. Then the machine learning will compare whether what it predicted was correct from the sensors collecting the user's actual movement, and then adjust its understanding accordingly to improve its prediction.

The main functions of the sensors is to understand how a foot is moving, how much force the foot it will want to put into the platform or other active surface, and where the force goes into the platform; the sensors will then feed that information into the system's machine learning model. A controller then controls the correct magnetic units so that the system can generate enough of a magnetic field in the path of the user's gait cycle and repulse the footwear just enough so that the force of the footwear doesn't translate into the platform.

In an example the sensors used include an inertial measurement unit (IMU) that has a six degree-of-freedom (DOF) inertial measurement unit (IMU) that measures {x, y, z} acceleration using an accelerometer (speed and distance can be calculated from the data as well) and {x, y, z} orientation using a gyroscope. Another sensor system is used to locate the footwear on the platform. In an example this is accomplished using an electromagnetic wave positional sensing system that uses radio frequencies (RF) to find out where the feet are (e.g., the footwear carrying RF sensors) on the platform through triangulation or trilateration. Another sensor system includes pressure sensors (force), in which a grid of sensors in the footwear is used to map forces under the feet to determine how pressure is distributed. This data can also be used to determine how much force is being put into the surface.

In some examples the magnets can be permanent or electromagnets; either type can be used to develop a changing magnetic field. In an example the magnetic units are Halbach arrays, which create a stronger field in one direction (up) than in the opposite direction. In other examples a small and powerful electromagnet is used instead. In an example the non-magnetic metal that is highly conductive in the shoes is made from aluminum and/or copper.

In an example of use of the system, the system obtains and uses the following sensor data: foot position, foot speed, foot acceleration, and force/pressure of the foot on the surface. In an example, the following details the system activity based on the user activity. User activity: Starting position: standing normally in center of platform. System activity: Baseline sensor data recorded. User activity: Foot is in motion to take a step. System activity: sensor data received and considered. Motion detected. System activates and prepares magnetic units in area of approximate foot landing (turned on and spinning). User activity: From initial contact. System activity: System calculates possible path of foot using senor data and repulsion of foot begins. User activity: During loading response to mid stance. System activity: System actively repulses foot from platform to remove friction between the footwear and the platform, during motion. User activity: During mid-stance to terminal stance & pre-swing. System activity: System tapers repulsion to match end of stepping motion at the end of the terminal stance and beginning of the pre-swing. Repeat the above when each foot initiates a new step. Skip to next step at any point when intent of motion is broken during gait (i.e., there is no positional change or acceleration). User activity: Intent of motion is stopped. System activity: magnetic units reduce activity significantly and stop if motion is abandoned. User activity: Other motion. System activity: If motion begins again from stopping, dependent on gait the system will pick up from previously intended motion.

A specific, non-limiting example of the system is depicted in the drawings. The platform includes a number of magnetic units. The magnetic units may be closely-packed together and located just under the top surface of the platform, to minimize the distance between the magnets and the metal carried by the footwear, in order to maximize the induced field and thus maximize the repulsive forces that can be developed. Each magnetic unit includes a magnet or magnetic array. The spin and spin speed, or the on/off state and field strength for an electromagnet, and the tilt or orientation of the magnet, is controlled by the controller, to achieve a desired induced magnetic field in the metal in the footwear, to thereby achieve a desired magnitude and direction of repulsive force between the platform and the footwear. The magnetic units can be configured to be able to handle the weight of the user, e.g., when the user is standing still.

Figure 1:
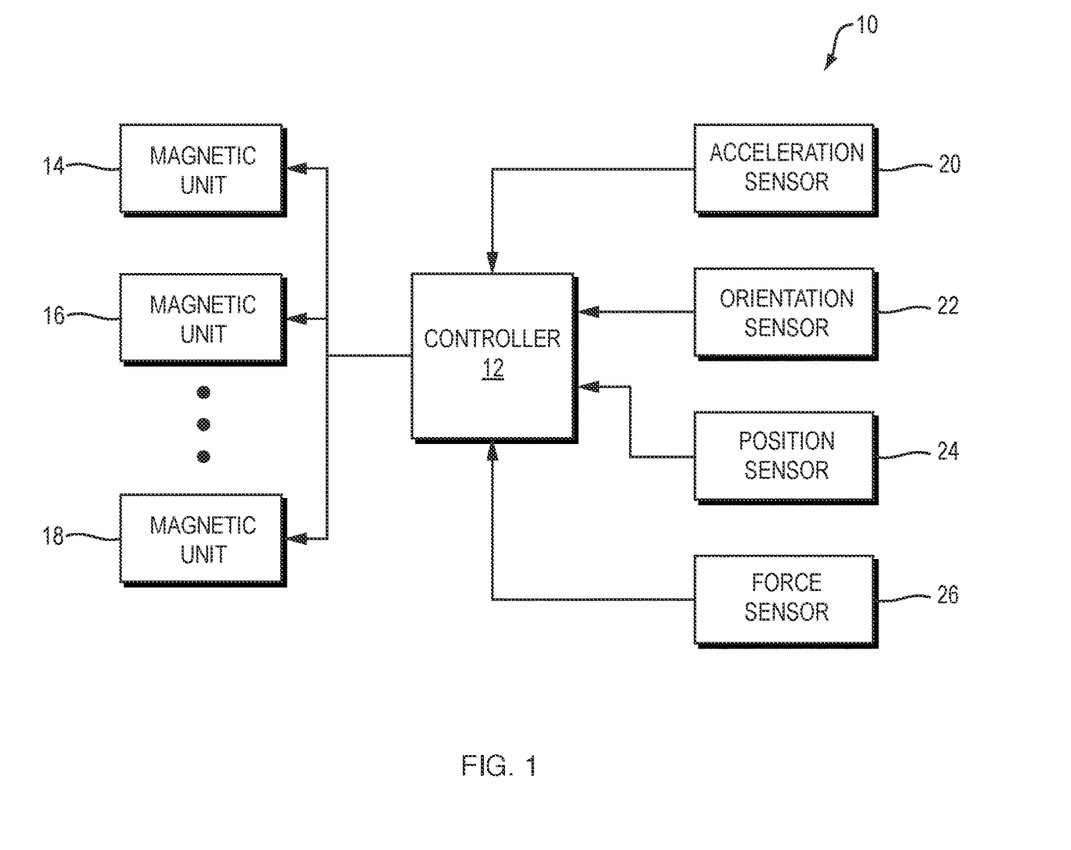
FIG. 1 is a functional block diagram of a system for counteracting foot motion relative to a surface.

FIG. 1 is a functional block diagram of a system 10 for counteracting foot motion relative to a surface. System 10 includes a number of separately-controllable magnetic units, illustrated by units 14, 16, and 18. Controller 12 is inputted with data from sensors that are at least in part carried by the footwear, including acceleration sensor 20, orientation sensor 22, position sensor 24, and force sensor 26. Exemplary operation and use of system 10 is described above.

Figure 2:
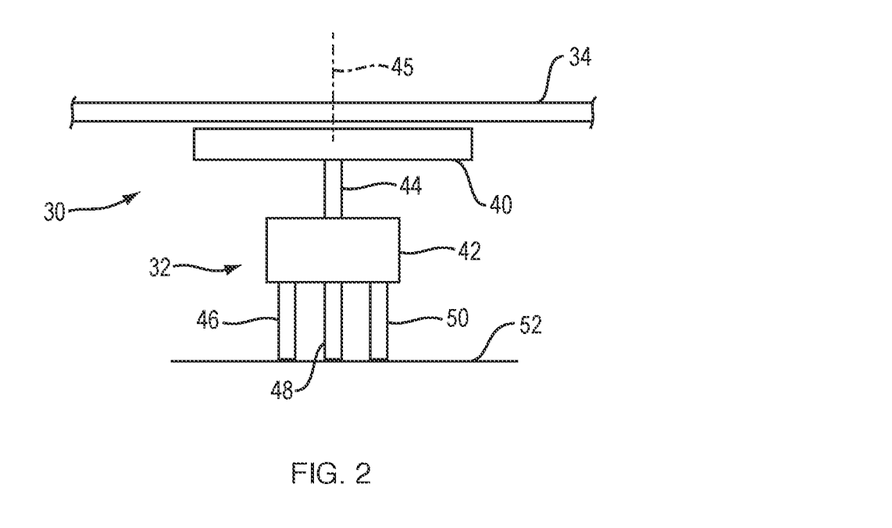
FIG. 2 is a schematic side view of a magnetic unit of the system for counteracting foot motion relative to a surface.

FIG. 2 is a schematic side view of a magnetic unit 30 of the system for counteracting foot motion relative to a surface. Unit 30 includes magnet or magnetic array 40 that is located just underneath surface 34 on which a user can stand. Assembly 32 is configured to spin magnet 40 about axis 45 using electric motor 42 that rotates shaft 44. For an electromagnet-based system there is no need for a motor or shaft. One or more linear actuators 46, 48, and 50, which rest on lower surface 52 and can be arranged in a triangular pattern, are optionally included and can be used to alter the tilt of magnet 40 relative to surface 34 via controlled lengthening of the actuators. Other means, not shown, may be included to allow the magnet to be tilted but not to impact surface 34. For example, the motor can be mounted via brackets to a series of shock-absorption rods, wherein the brackets can slide up and down on the rods to lower or raise pats of the motor and thus lower or raise parts of the magnet.

Figure 3A:
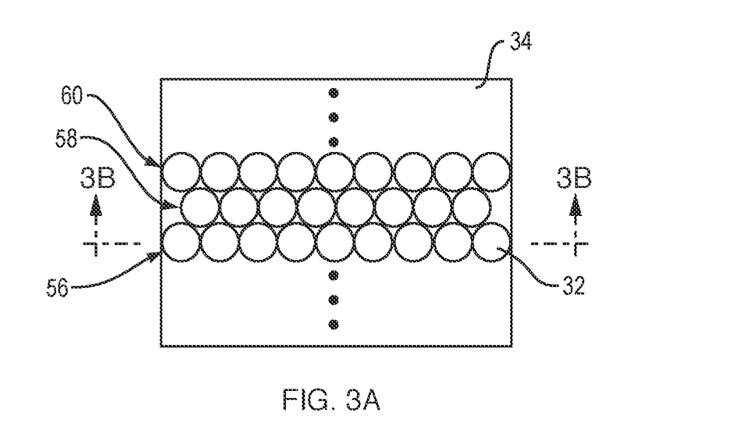
FIG. 3A is a schematic partial top view of a platform for the system for counteracting foot motion relative to a surface.
Figure 3B:
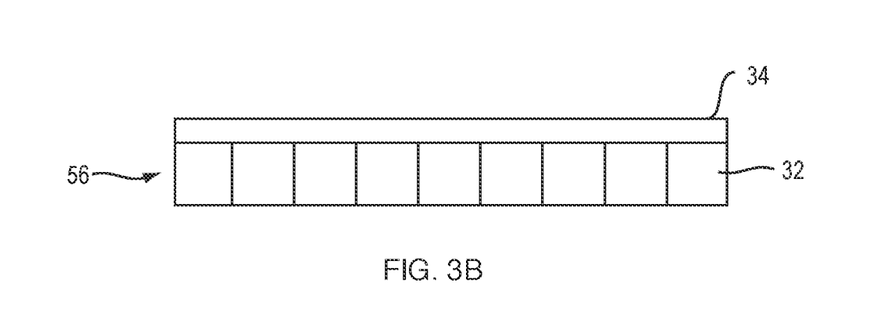
FIG. 3B is a schematic cross-sectional view taken along line 3B-3B of FIG. 3A.

FIG. 3A is a schematic partial top view of top 34 of a platform for the system for counteracting foot motion relative to surface 34. A number of magnetic units are located underneath top surface 34 and are controlled as described above. In an example the magnetic units are depicted as close-packed circles 32 from this top view, with the circles arranged in a number of rows, with only rows 56, 58, and 60 shown. The idea is to provide as many magnetic units as possible spanning the area in which foot friction control is desired, which in this case is the entirety of rectangular top 34. FIG. 3B is a schematic cross-sectional view taken along line 3B-3B of FIG. 3A, schematically illustrating row 56 that includes nine magnetic units 32 just below top surface 34.

Figure 4:
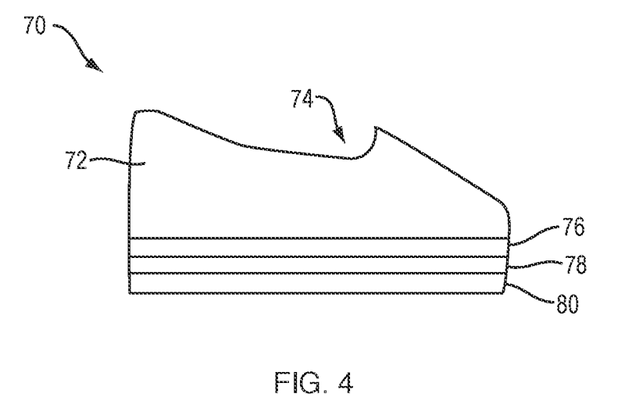
FIG. 4 is a schematic side view of footwear for the system for counteracting foot motion relative to a surface.

FIG. 4 is a schematic side view of footwear 70 for the system for counteracting foot motion relative to a surface. Footwear 70 has upper 72 with opening 74 for the foot, as in a normal show or sneaker. The sole includes non-magnetic metal 80, thermal sink layer 78, and insulator layer 76. Note that these three parts can be arranged as desired to accomplish the results described herein.

Figure 5:
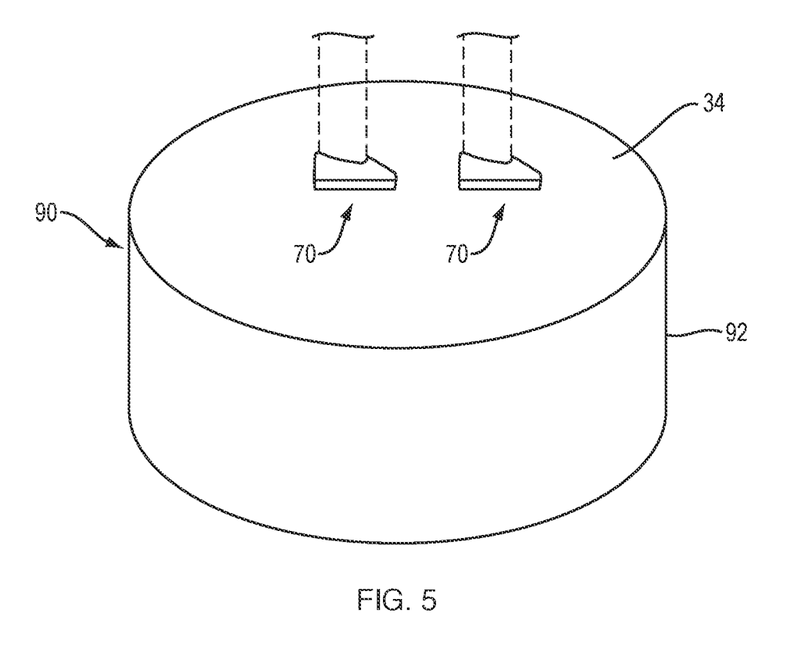
FIG. 5 is a partial schematic view of a user standing on a platform that uses the subject system and method.

FIG. 5 is a partial schematic view of a user standing on a platform 90 that uses the subject system and method. The user is indicated via legs shown in phantom in each of footwear 70 that are located on surface 34, which is at the top of platform 92 that houses the magnetic units.

Figure 6:
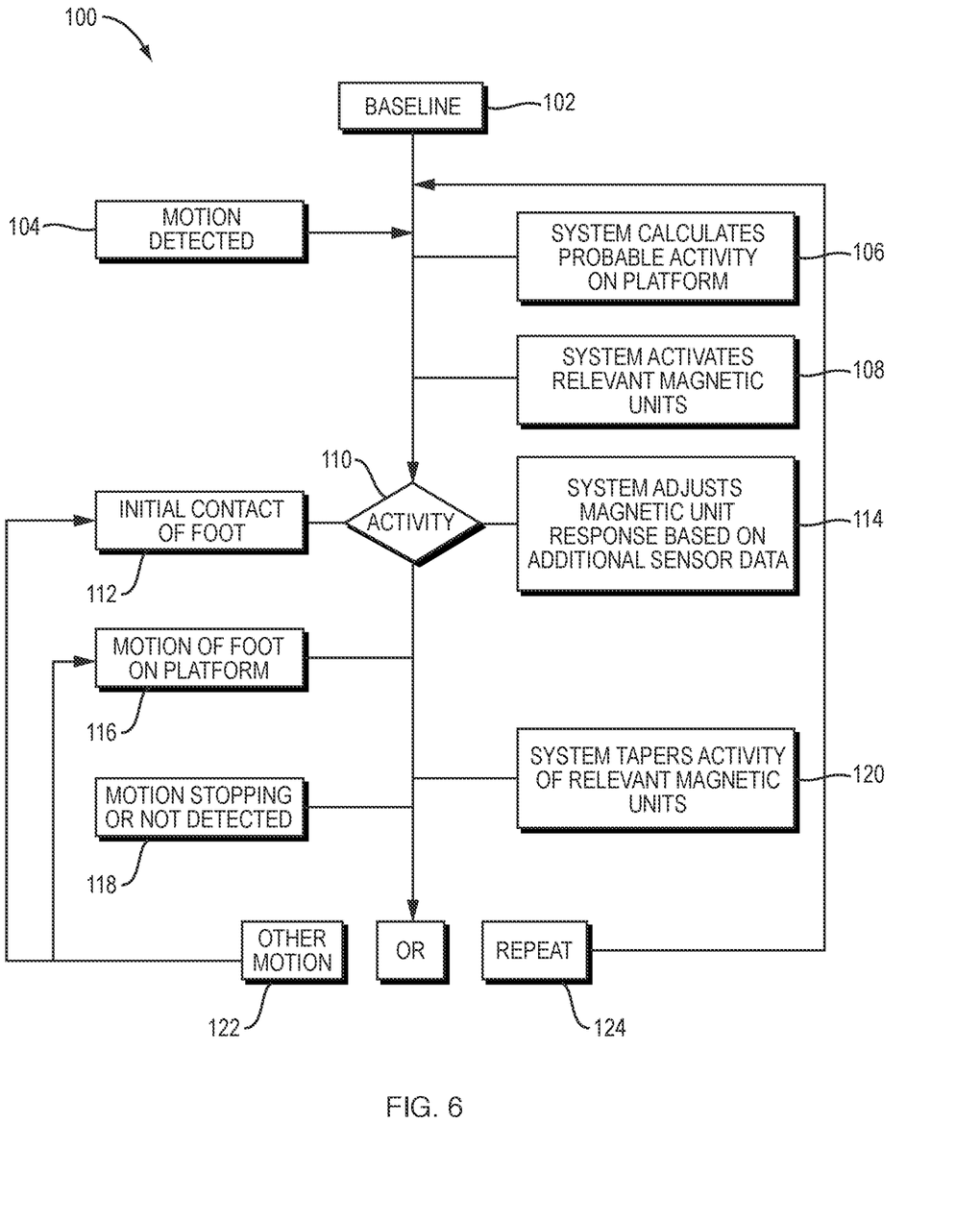
FIG. 6 is a flowchart that illustrates an operation of the system for counteracting foot motion relative to a surface, and also helps describe a method for counteracting foot motion relative to a surface.

FIG. 6 is a flowchart that illustrates an operation 100 of the system for counteracting foot motion relative to a surface, and also helps describe a method for counteracting foot motion relative to a surface. From start or baseline 102 motion is detected 104, using the motion sensors. The system (via the controller) calculates probably activity, step 106, and then activates the relevant magnetic units, step 108, to counteract the expected footwear friction. When there is activity 110 (e.g., sensed motion such as initial contact of the foot 112, or motion of the foot on the platform 116), the system adjusts the magnetic unit operations (e.g., turning them on/off, adjusting their magnetic fields), step 114. When foot motion is stopped or not detected, step 118, the system tapers/stops the relevant magnetic units, step 120. If other motion is detected, step 122, operation returns to step 110. Otherwise operation returns to baseline status 102.

Elements of figures are shown and described as discrete elements in a block diagram. These may be implemented as one or more of analog circuitry or digital circuitry. Alternatively, or additionally, they may be implemented with one or more microprocessors executing software instructions. The software instructions can include digital signal processing instructions. Operations may be performed by analog circuitry or by a microprocessor executing software that performs the equivalent of the analog operation. Signal lines may be implemented as discrete analog or digital signal lines, as a discrete digital signal line with appropriate signal processing that is able to process separate signals, and/or as elements of a wireless communication system.

When processes are represented or implied in the block diagram, the steps may be performed by one element or a plurality of elements. The steps may be performed together or at different times. The elements that perform the activities may be physically the same or proximate one another, or may be physically separate. One element may perform the actions of more than one block.

Examples of the systems and methods described herein comprise computer components and computer-implemented steps that will be apparent to those skilled in the art. For example, it should be understood by one of skill in the art that the computer-implemented steps may be stored as computer-executable instructions on a computer-readable medium such as, for example, floppy disks, hard disks, optical disks, Flash ROMS, nonvolatile ROM, and RAM. Furthermore, it should be understood by one of skill in the art that the computer-executable instructions may be executed on a variety of processors such as, for example, microprocessors, digital signal processors, gate arrays, etc. For ease of exposition, not every step or element of the systems and methods described above is described herein as part of a computer system, but those skilled in the art will recognize that each step or element may have a corresponding computer system or software component. Such computer system and/or software components are therefore enabled by describing their corresponding steps or elements (that is, their functionality), and are within the scope of the disclosure.

Functions, methods, and/or components of the methods and systems disclosed herein according to various aspects and examples may be implemented or carried out in a digital signal processor (DSP) and/or other circuitry, analog or digital, suitable for performing signal processing and other functions in accord with the aspects and examples disclosed herein. Additionally or alternatively, a microprocessor, a logic controller, logic circuits, field programmable gate array(s) (FPGA), application-specific integrated circuits) (ASIC), general computing processor(s), micro-controller (s), and the like, or any combination of these, may be suitable, and may include analog or digital circuit components and/or other components with respect to any particular implementation.

Functions and components disclosed herein may operate in the digital domain, the analog domain, or a combination of the two, and certain examples include analog-to-digital converters) (ADC) and/or digital-to-analog converter(s) (DAC) where appropriate, despite the lack of illustration of ADC's or DAC's in the various figures. Further, functions and components disclosed herein may operate in a time domain, a frequency domain, or a combination of the two, and certain examples include various forms of Fourier or similar analysis, synthesis, and/or transforms to accommodate processing in the various domains.

Any suitable hardware and/or software, including firmware and the like, may be configured to carry out or implement components of the aspects and examples disclosed herein, and various implementations of aspects and examples may include components and/or functionality in addition to those disclosed. Various implementations may include stored instructions for a digital signal processor and/or other circuitry to enable the circuitry, at least in part, to perform the functions described herein.

Having described above several aspects of at least one example, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. A system for counteracting foot motion relative to a surface, wherein the foot carries footwear, the system comprising:
a plurality of magnetic units, each unit comprising a magnet located proximate an underside of the surface;
sensors for determining one or more of the position, orientation, acceleration, and force of the foot on the surface; and
a controller that is in communication with the sensors and the magnetic units, wherein the controller is configured to control the magnets to develop a time-varying magnetic field that induces currents in a conductor of the footwear such that a magnetic field created by the induced currents opposes the time-varying magnetic field, creating a repulsive force that reduces frictional forces between the footwear and the surface.

2. The system of claim 1, wherein the controller is configured to control the magnets so as to oppose friction of the footwear on the surface such that the person can walk on the surface without substantially changing their relative position, so that the person is able to move normally while remaining on the surface.

3. The system of claim 1, wherein the surface is part of a platform on which a person can stand and move.

4. The system of claim 3, wherein the sensors are configured to sense motions of at least parts of a user's body.

5. The system of claim 4, further comprising a controller that is configured to feed the sensed motions to a virtual reality scene such that a player of a virtual reality video game is able to move normally on the platform in the person's interactions with the game.

6. The system of claim 1, wherein the footwear comprises a non-magnetic metal, wherein a magnetic field can be induced in the non-magnetic metal by the magnetic field from the magnetic units.

7. The system of claim 6, wherein the footwear further comprises at least one of material to cool the non-magnetic metal and insulation between the non-magnetic metal and the user's foot in the footwear.

8. The system of claim 6, wherein the footwear further comprises at least one of a position sensor, an orientation sensor, an acceleration sensor, an inertial measurement unit that is configured to sense acceleration and orientation, and a force sensor.

9. The system of claim 1, wherein the magnetic units each comprise a motor that is configured to spin the magnet of the magnetic unit.

10. The system of claim 9, wherein the magnet of the magnetic unit comprises a Halbach magnetic array.

11. The system of claim 9, wherein the controller is configured to control when the magnets are spun.

12. The system of claim 11, wherein the controller is further configured to control a spin speed of the magnets.

13. The system of claim 1, wherein the magnetic units each comprise an electromagnet.

14. The system of claim 13, wherein the controller is further configured to control whether the electromagnet is on or off.

15. The system of claim 13, wherein the controller is further configured to control a strength of a magnetic field from the electromagnet.

16. The system of claim 1, wherein the controller is further configured to use sensor data to make predictions of foot movement that are used to determine control of the magnetic units.

17. The system of claim 16, wherein the controller is further configured to compare predictions of foot movement to sensed foot movements, and adjust future foot movement predictions based on the comparison.

18. A system for counteracting foot motion of a user relative to a surface, comprising:
a plurality of magnetic units, each unit comprising a magnet located proximate an underside of the surface;
footwear configured to be worn by the user and comprising a non-magnetic conductor;
sensors for determining at least the position, orientation, acceleration, and force of the foot on the surface; and
a controller that is in communication with the sensors and the magnetic units, wherein the controller is configured to control the magnets to develop a time-varying magnetic field that induces currents in the conductor of the footwear such that a magnetic field created by the induced currents opposes the time-varying magnetic field, creating a repulsive force that reduces frictional forces between the footwear and the surface.

19. The system of claim 18, wherein the footwear further comprises a material to cool the non-magnetic conductor, and insulation between the non-magnetic metal and an expected location of the user's foot in the footwear.

20. The system of claim 18, wherein the footwear further comprises: a position sensor; an orientation sensor; an acceleration sensor; an inertial measurement unit that is configured to sense acceleration and orientation; and a plurality of force sensors.

* * * * *